United States Patent
Dishman et al.

(10) Patent No.: US 8,018,088 B2
(45) Date of Patent: Sep. 13, 2011

(54) APPARATUS, SYSTEM, AND METHOD FOR A SYNCHRONOUS MULTIPLE OUTPUT POWER SUPPLY

(75) Inventors: C. Charles Dishman, Raleigh, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 12/346,242

(22) Filed: Dec. 30, 2008

(65) Prior Publication Data

US 2010/0164279 A1 Jul. 1, 2010

(51) Int. Cl.
*H02J 3/00* (2006.01)

(52) U.S. Cl. .......................................... 307/17

(58) Field of Classification Search .................. 307/151, 307/17, 31; 363/16, 21.06, 21.12
See application file for complete search history.

(56) References Cited

U.S. PATENT DOCUMENTS

| | | |
|---|---|---|
| 2004/0090801 A1 | 5/2004 | Chen et al. |
| 2004/0145242 A1* | 7/2004 | Rodriguez et al. ............. 307/11 |
| 2007/0216319 A1 | 9/2007 | Wai et al. |

OTHER PUBLICATIONS

Youhao Xi; Jain, P.K.; , "A forward converter topology with independently and precisely regulated multiple outputs," Power Electronics, IEEE Transactions on , vol. 18, No. 2, pp. 648-658, Mar. 2003.*

* cited by examiner

*Primary Examiner* — Jared J Fureman
*Assistant Examiner* — Daniel Cavallari
(74) *Attorney, Agent, or Firm* — Kunzler Needham Massey & Thorpe

(57) ABSTRACT

Efficient multiple power outputs are provided by receiving a primary voltage as an input to a bridge module and providing one or more secondary voltages as outputs of the bridge module. The secondary voltages are generated on the secondary side of one or more respective secondary windings of a transformer. The bridge module includes at least one primary complementary pair of switches on the primary winding side of the transformer and a secondary complementary pair of switches on the secondary side of each secondary winding of the transformer. The secondary output voltages are received from the bridge module by one or more output voltage regulation modules. Each output voltage regulation module receives one of the secondary voltages from the bridge module as an input and provides at least one regulated output voltage as an output.

20 Claims, 6 Drawing Sheets

APPARATUS, SYSTEM, AND METHOD FOR A SYNCHRONOUS MULTIPLE OUTPUT POWER SUPPLY

BACKGROUND

1. Field of the Invention

This invention relates to power supplies and more particularly relates to increasing the efficiency of power supplies with multiple power outputs.

2. Description of the Related Art

A power supply, sometimes known as a power supply unit or PSU, is a device or system that supplies electrical or other types of energy to a load or group of loads. A power supply, in some embodiments may be configured to convert power in one form to another form, such as converting alternating current ("AC") power to direct current ("DC") power. The regulation of power supplies is typically done by incorporating circuitry to tightly control the output voltage and/or current of the power supply to a specific value. The specific value is typically closely maintained despite variations in the load presented to the power supply's output, or any reasonable voltage variation at the power supply's input.

For example, in an electronic device such as a computer, the power supply is typically designed to convert an AC voltage input such as is traditionally provided by a conventional wall socket, into several low-voltage DC power outputs for transmission to the internal components of the electronic device. Conversion is typically performed in stages that may include various stages such as a rectification stage, a pre-regulation stage such as an active harmonic filter, a regulator/chopper stage, etc. The stages may be configured in various topologies such as a boost stage, a buck stage, or other derivative topology.

In addition to providing main power outputs to various electronic devices, power supplies are often configured to provide auxiliary and standby power to background systems and sub-systems within an electronic device. For example, even when an electronic device is not fully operational, or is turned off, power may still be needed to power system clocks, system controllers, system monitors and the like. Conventional power supplies typically include several stages of power conversion in order to provide main power as well as standby and auxiliary power. In some embodiments, the power supply itself may require auxiliary power to run the control and drive circuits within the power supply. In a common system, a main output voltage of 12 volts may be generated. Additional 5 volt and 3.3 volt auxiliary voltages may be derived from the main output voltage by implementing additional conversion stages, which can be expensive to implement and which decrease the efficiency of the power supply.

For example, in a power supply that provides a 12 volt main output voltage, a DC to DC regulator may be utilized to convert the 12 volt output to a 3.3 volt output to provide power to standby circuits. The additional DC to DC regulator results in a significant additional power loss and can be costly to implement. This embodiment is inefficient because inefficiencies are compounded where the power is converted multiple times and losses occur at each stage. In some embodiments, several additional DC to DC regulators may be required to generate additional voltage levels that may be needed in the auxiliary and standby circuitry. The net result of such conventional methods of providing standby and auxiliary power is that the overall efficiency of the power system is lower and the cost is higher.

Thus, most multistage power systems do not have a very high overall efficiency due to loss of power in each stage. For example, if the efficiency of the first stage is 96%, second stage is 90%, and third stage is 87%, then the overall efficiency of the circuit is only 75%. The result is an overall loss of efficiency.

BRIEF SUMMARY

From the foregoing discussion, it should be apparent that a need exists for an apparatus, system, and method that efficiently provide multiple power outputs without utilizing multiple consecutive conversion stages. Beneficially, such an apparatus, system, and method would provide auxiliary and standby power in a very efficient manner, in some cases above 90% efficiency. This is accomplished by avoiding the use of multiple stages as is done in the conventional art, and instead using a multiple output power supply where the primary stage is typically a zero-voltage-switching 50/50 duty-cycle bridge converter. The output of such a regulator is made available on multiple windings of a common or multiple transformers. Each winding output is preferably pulse width modulated to provide a regulated output with minimum loss in the process. Due to the lower number of sequential conversion stages, the overall efficiency of the power supply can be greatly increased.

The present invention has been developed in response to the present state of the art, and in particular, in response to the problems and needs in the art that have not yet been fully solved by currently available power supplies and regulators. Accordingly, the present invention has been developed to provide an apparatus, system, and method for providing efficient multiple power outputs that overcome many or all of the above-discussed shortcomings in the art.

The apparatus is provided with a plurality of modules including a bridge module and one or more output voltage regulation modules. The bridge module typically receives a primary voltage as an input and provides one or more secondary voltages as outputs. The one or more secondary voltages are substantially direct current ("DC") voltages, and the one or more secondary voltages are generated on the secondary side of one or more respective secondary windings of a transformer. The one or more secondary windings are coupled to a primary winding of the transformer. The bridge module includes at least one primary complementary pair of switches on the primary winding side of the transformer and a secondary complementary pair of switches on the secondary side of each secondary winding of the transformer. The complementary switches are operated in an open loop at about a 50% duty cycle to generate the secondary voltages on the secondary side of the transformer.

Each output voltage regulation module receives one of the secondary voltages from the bridge module as an input and provides at least one regulated output voltage as an output. Each of the one or more output voltage regulation modules corresponds respectively to one of the one or more secondary windings of the bridge module.

In one embodiment, at least the switches of the primary complementary pair of switches on the primary winding side of the transformer are operated in a zero voltage switching mode. In a further embodiment, the switches of the primary complementary pair of switches on the primary winding side of the transformer are configured in a half-bridge topology. In an alternate embodiment, the primary complementary pair of switches is a first primary complementary pair of switches and the bridge module also includes a second primary complementary pair of switches. The first and second pairs of primary complementary switches may be configured in a full-bridge topology with the first and second primary pairs of complementary switches operated in a zero voltage switching mode.

In one embodiment, each regulated output voltage is configured to be within a predefined threshold voltage of the corresponding secondary voltage provided on the secondary side of the transformer. This allows even greater efficiency of the power supply. In a further embodiment, each of the output regulation modules includes an output switching regulator with at least one switch and a switch controller, the switch controller operating the at least one switch to regulate the corresponding regulated output voltage. The predefined threshold voltage for each regulated output voltage may be defined such that the output switching regulator operates above a predefined efficiency threshold. Typically the closer the regulated output voltage is to the corresponding secondary voltage, the more efficient the power supply will be. In some cases the predefined efficiency threshold corresponds to a duty cycle range of the output switching regulator where the output switching regulator operates near a maximum efficiency.

In one embodiment, at least one of the output voltage regulation modules provides at least two regulated output voltages derived from a single secondary winding of the transformer. In further embodiments, each of the at least two regulated output voltages derived from the single secondary winding are configured to be within a predetermined threshold voltage of the corresponding secondary voltage generated on the secondary side of the single secondary winding. Two output voltages can be efficiently derived from a single winding especially when the two output voltages and the corresponding secondary voltage are all close in value. Each of the at least two regulated output voltages derived from the single secondary winding may be regulated by a distinct output switching regulator with at least one switch and a switch controller. Preferably, the switch controller operates the at least one switch to regulate the corresponding regulated output voltage to a desired value.

A system of the present invention is also presented that substantially includes the modules and embodiments described above with regard to the apparatus. The system typically includes a power supply configured to provide power to one or more electronic devices where the power supply includes a bridge module and two more output voltage regulation modules as described above.

The system may further include one or more electronic devices that receive regulated power from the power supply. In one embodiment, at least one of the one or more electronic devices comprises one of a blade server, peripheral component interconnect ("PCI") card, personal computer, laptop, router, switch, personal digital assistant, appliance, and digital media player.

A method of the present invention is also presented for providing efficient multiple power outputs. The method in the disclosed embodiments substantially includes the steps necessary to carry out the functions presented above with respect to the operation of the described apparatus and system. In one embodiment, the method includes receiving a primary voltage as an input to a bridge module and providing one or more secondary voltages as outputs of the bridge module. The one or more secondary voltages are substantially direct current ("DC") voltages, and the one or more secondary voltages are generated on the secondary side of one or more respective secondary windings of a transformer. The one or more secondary windings are preferably coupled to a primary winding of the transformer. The bridge module includes at least one primary complementary pair of switches on the primary winding side of the transformer and a secondary complementary pair of switches on the secondary side of each secondary winding of the transformer. The complementary switches are operated in an open loop at about a 50% duty cycle to generate the secondary voltages.

The method also includes receiving the secondary output voltages from the bridge module as inputs to one or more output voltage regulation modules. Each output voltage regulation module receives one of the secondary voltages from the bridge module as an input and provides at least one regulated output voltage as an output. Each of the one or more output voltage regulation modules correspond respectively to one of the one or more secondary windings of the bridge module.

In one embodiment, at least the switches of the primary complementary pair of switches on the primary winding side of the transformer are operated in a zero voltage switching mode. In a further embodiment, the switches of the primary complementary pair of switches on the primary winding side of the transformer are configured in a half-bridge topology. In yet another embodiment, the primary complementary pair of switches is a first primary complementary pair of switches and the bridge module also includes a second primary complementary pair of switches. The first and second pairs of primary complementary switches are preferably configured in a full-bridge topology, and the first and second pairs of primary complementary switches operated in a zero voltage switching mode.

In one embodiment, each regulated output voltage is configured to be within a predefined threshold voltage of a corresponding secondary voltage provided on the secondary side of the transformer. In a further embodiment, each of the output regulation modules comprises an output switching regulator with at least one switch and a switch controller. The switch controller operates the at least one switch to regulate the corresponding regulated output voltage. The predefined threshold voltage for each regulated output voltage is defined such that the output switching regulator operates above a predefined efficiency threshold.

A power supply is also presented that substantially encompasses the apparatus, system, and method described herein including the modules, embodiments, and steps described above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
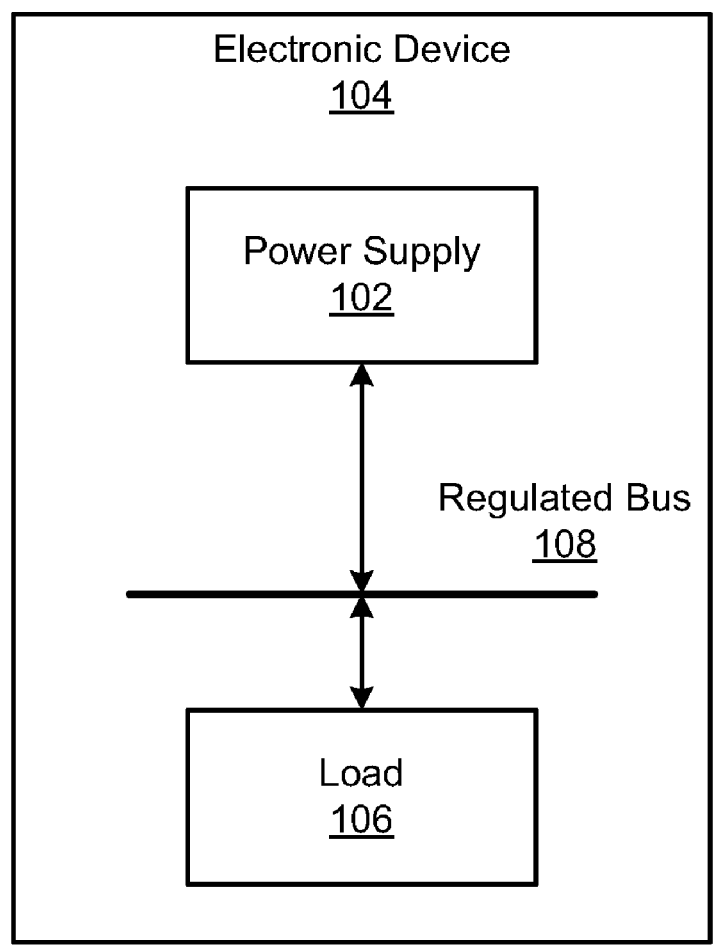
FIG. 1 is a schematic block diagram illustrating one embodiment of a system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 that provides efficient multiple power outputs in accordance with the present invention. The system 100 includes a power supply 102, an electronic device 104, a regulated bus 108, and a load 106.

The power supply 102 provides regulated power to the electronic device 104 to power various electronic systems and subsystems within the electronic device 104. The power supply 102 is typically connected to the electronic device 104 by a regulated bus 108 or similar device. The regulated bus 108 and power supply 102 may be configured to provide one or more different voltages and currents to the electronic device 104. For example, in a typical power supply, voltages of +12 volts, +5 volts, +3.3 volts, and −12 volts are commonly provided. Preferably the power supply 102 is a switching power supply. As will be recognized by those of skill in the art a switching power supply or switched-mode power supply ("SMPS") is a power supply that incorporates a switching regulator. A switching regulator regulates power by switching a transistor or other switch on and off with a variable duty cycle to produce a desired output signal.

In various embodiments, the electronic device 104 maybe a computer system, such as a desktop, laptop, or server, and the power supply 102 may be configured to provide power to the various components of the computer system. In other embodiments, the electronic device 104 may include devices such as a blade server, a peripheral component interconnect ("PCI") card, routers, personal digital assistants (PDAs), switches, appliances, digital media players, displays, or other electronic devices as recognized by one of skill in the art. In one embodiment, the power supply 102 may be implemented within the same enclosure as the electronic device 104, such as within a computer tower case. In other embodiments, the power supply 102 may be implemented external to the electronic device 104 and may be connected to the electronic device 104 via a connection means such as a cord, cable, or bus such as in a blade center.

The electronic device 104 causes a load 106 to be applied to the power supply 102. The amount of load 106 may affect the performance of the power supply 102. The power supply 102 is preferably configured to operate efficiently in conjunction with a specified load 106. In one embodiment, the load 106 may vary depending on the operation characteristics of the electronic device 104 and the power supply 102 may be configured to adjust accordingly. For example, the power supply 102 may include a feedback signal for adjusting the power output characteristics of the power supply 102 in response to changes in the load 106. Typically, the power supply 102 regulates the voltage on the regulated bus 108 so as to provide substantially constant voltage levels to the electronic device 104 under varying load conditions. In various embodiments, the load 106 may be inside the electronic device 104, outside the electronic device 104, or both.

In accordance with the present invention, the system 100 is preferably configured to provide bias, auxiliary, and standby voltages in an efficient and cost effective manner. A conventional power supply 102 may include various stages for converting and regulating voltages and currents. The various types of stages may include, for example, buck converters, boost converters, fly-back converters, etc. as well as many variations of these types of stages. The regulation stages typically utilize an inductor in conjunction with some configuration of a diode, a capacitor, and switch to provide a regulated power source. In a particularly common configuration, a rectification stage may be utilized to rectify an incoming alternating current ("AC") signal as is typically provided from a wall outlet. In one embodiment a boost regulator or boost converter may be provided to receive the rectified signal and convert it to a boosted direct current ("DC") voltage signal, usually about 400 volts. Of course, in various embodiments the boosted voltage may be provided at other voltage levels. The boosted signal is then provided to one or more secondary stages which further convert the signal into a desired format such as 12, 5, and 3.3 volt signals. Numerous additional stages are often needed to obtain all of the desired bias, auxiliary, and standby power signals that are needed. This results in large power losses and inefficiency and the additional stages can be expensive to build and implement.

The present invention reduces the power losses and high cost by avoiding the use of multiple sequential conversion stages to generate multiple, disparate output voltages including auxiliary and standby voltages. In accordance with the present invention, the power supply 102 may include a primary stage that is similar to a zero-voltage-switching, 50/50, bridge converter. Zero-voltage-switching means that the switches in the bridge power converter are closed or on when there is substantially no voltage across the switches. 50/50 means that complementary pairs of switches that make up the bridge power converter (i.e. half-bridge, full-bridge, push-pull converter) are each operated at approximately 50% duty cycle such that a substantially full duty cycle is achieved and equally shared by the switches. This allows a substantially constant direct current ("DC") voltage to be achieved as an output of the bridge converter and allows the bridge converter to be operated in an open-loop mode without pulse width modulation from a feedback signal.

However, as will be recognized by those of skill in the art, during zero-voltage-switching ("ZVS"), a first complementary switch is not turned on/off at exactly the same time as a corresponding complementary switch. Rather, the switches are typically turned on/off in slightly underlapping patterns in order to take advantage of the parasitic capacitance of the switches, thereby reducing losses. Typically, a switch is opened slightly before the corresponding complementary switch is closed. This allows the voltage across the switch that is about to be turned closed to be forced to zero as the parasitic capacitance of the transitioning switch charges to the voltage of the input. Zero-voltage switching is desirable because parasitic switching losses are greatly reduced by switching with little or no voltage across the closing switch, thus increasing power supply efficiency. One of skill in the art will recognize the benefits and operation of zero-voltage-switching.

By using a near 50% duty cycle for the primary stage, the duty cycle can run open loop at a fixed duty cycle that ensures a constant high efficiency. The duty cycle for the primary stage is set so that there is just enough of a gap between when switches open and others close so that the primary stage can operate constantly in zero-voltage switching mode. Also, by running open loop the cost of components can be reduced.

In accordance with the present invention, the output of the bridge converter is made available on multiple windings of a common transformer or multiple transformers. Each separate winding output is pulse width modulated to provide a regulated output (i.e. auxiliary and standby voltages such as +5 volts and +3.3 volts in addition to a main output voltage such as +12 volts) with minimum power losses. This allows for the system 100 to achieve a very high efficiency by reducing the number of stages needed to generate the desired output voltages.

Figure 2:
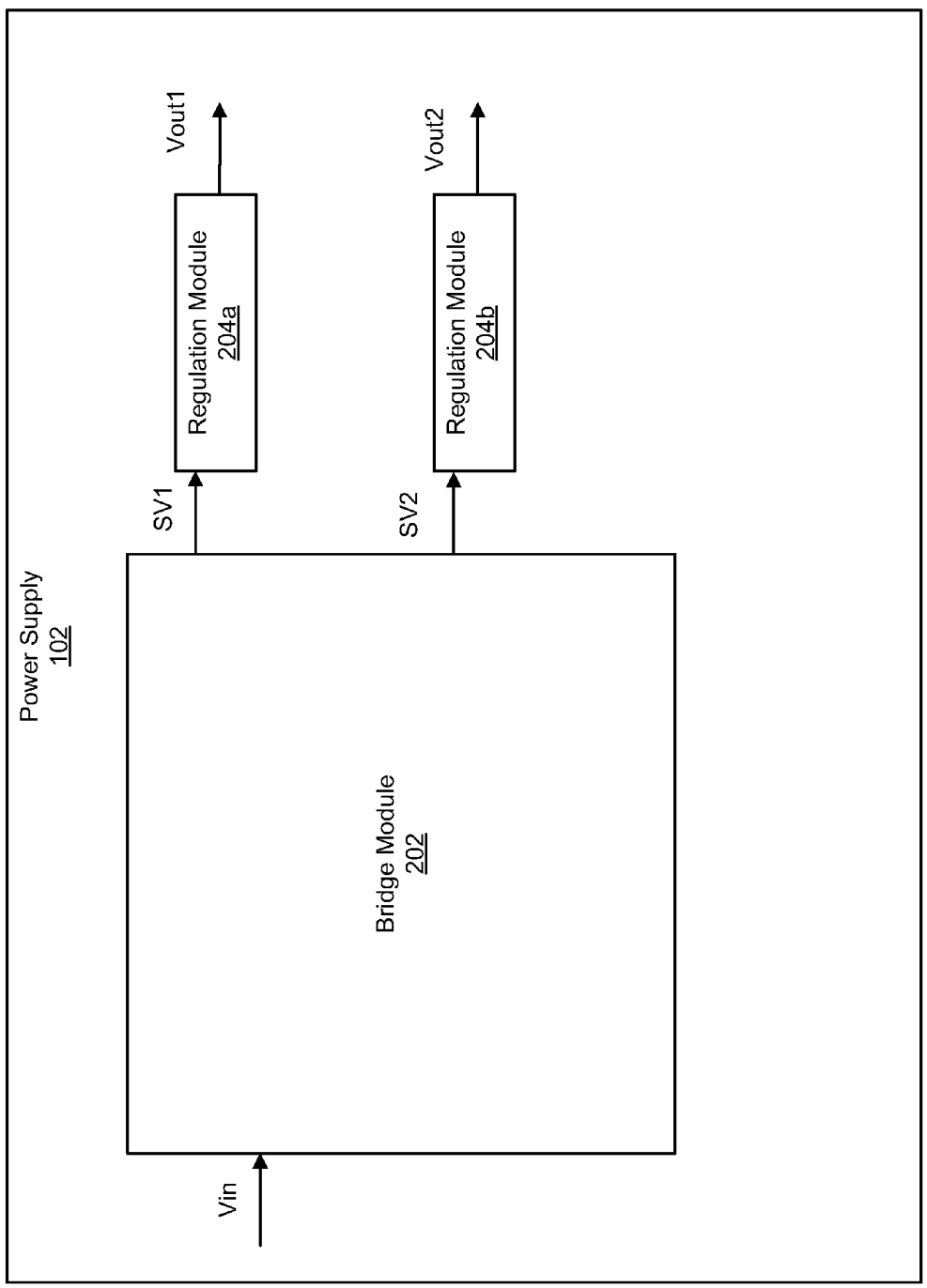
FIG. 2 is a schematic block diagram illustrating one embodiment of a power supply in accordance with the present invention.

FIG. 2 is a schematic block diagram illustrating one embodiment of a power supply 102 in accordance with the present invention. The power supply 102 includes a bridge module 202 and a plurality of regulation modules 204a-b. The bridge module 202 receives a primary voltage Vin as an input and provides one or more secondary voltages SV1, SV2 as outputs. In various embodiments, the primary voltage Vin may be provided by various supplies. For example, in a common embodiment, the primary voltage Vin may be provided by a previous regulation stage such as a boost or buck stage in the power supply 102. In other embodiments, the primary voltage Vin might be provided by an external source such as another power supply or power source.

The bridge module 202 typically includes at least one transformer with a primary winding on the input side of the transformer and one or more secondary windings on the output side of the transformer. The bridge module 202 preferably includes at least one primary complementary pair of switches on the primary winding side of the transformer and a secondary complementary pair of switches on the secondary side of each secondary winding of the transformer for regulating the secondary voltages SV1, SV2. Those of skill in the art will recognize that a half-bridge topology typically includes a single pair of primary complementary switches on the primary side of a transformer, whereas a full-bridge topology typically includes two pairs of primary complementary switches on the primary side of a transformer. As will be recognized by those of skill in the art, a full-bridge with four switches may also be operated in an open-loop, zero-voltage-switching mode similar to that described herein with regard to the half-bridge topology.

Similarly, a push-pull converter may be operated in an open-loop, zero-voltage-switching mode. Although this application substantially describes embodiments that include a half-bridge topology, it is contemplated that half-bridge, full-bridge, push-pull converter and other similar topologies may be utilized in accordance with the present invention.

The primary and secondary complementary pairs of switches are operated to pass power from the primary side of the transformer to the secondary side of the transformer. Preferably, the complementary switches are operated in a zero-voltage-switching mode in an open loop at about a 50% duty cycle to generate secondary voltages SV1, SV2 on the secondary side of each secondary winding of the transformer. By operating the switches in an open loop, a substantially direct current ("DC") voltage can be generated on the secondary side of each secondary winding without the need for a feedback controller. The operation of the switches will be described in detail below.

The voltage regulation modules 204a-b each receive one of the secondary voltages SV1, SV2 as an input and provide at least one regulated output voltage Vout1, Vout2 as an output. Preferably, the number of windings in each of the secondary windings of the transformer is selected such that the generated secondary voltages SV1, SV2 are near or slightly greater than the desired regulated output voltages Vout1, Vout2. Generally, the closer the secondary voltages SV1, SV2 are to the regulated output voltages Vout1, Vout2, the more efficient the system becomes. For example, if a regulated output voltage Vout1 of +12 Volts is desired, then the number of windings in the corresponding secondary winding might be selected to generate a substantially DC secondary voltage SV1 of about +12.3 Volts. In some embodiments, the system 100 might be designed such that each output voltage Vout1, Vout2 is configured to be within a predefined threshold voltage of the corresponding secondary voltage SV1, SV2 in order ensure a required operating efficiency. For example, a threshold might be defined to ensure a 90% or 95% operating efficiency depending on the desired specifications.

Preferably, each voltage regulation module 204a-b is a switching regulator that includes a pulse width modulator and one or more switches for regulating the output voltages Vout1, Vout2. The pulse width modulator may utilize a feedback signal to operate the switches such that the output voltages Vout1, Vout2 are regulated at a substantially constant voltage level. In various embodiments, the voltage regulation modules 204a-b may also utilize additional regulation and filtration circuitry such as inductors or capacitors to generate the desired output voltages Vout1, Vout2 in the desired form. Although only two voltage regulation modules 204a-b are depicted, it is contemplated that numerous voltage regulation modules 204a-b may be provided in conjunction with numerous secondary windings of the transformer in order to provide many voltage outputs Vout1, Vout2.

Figure 3:
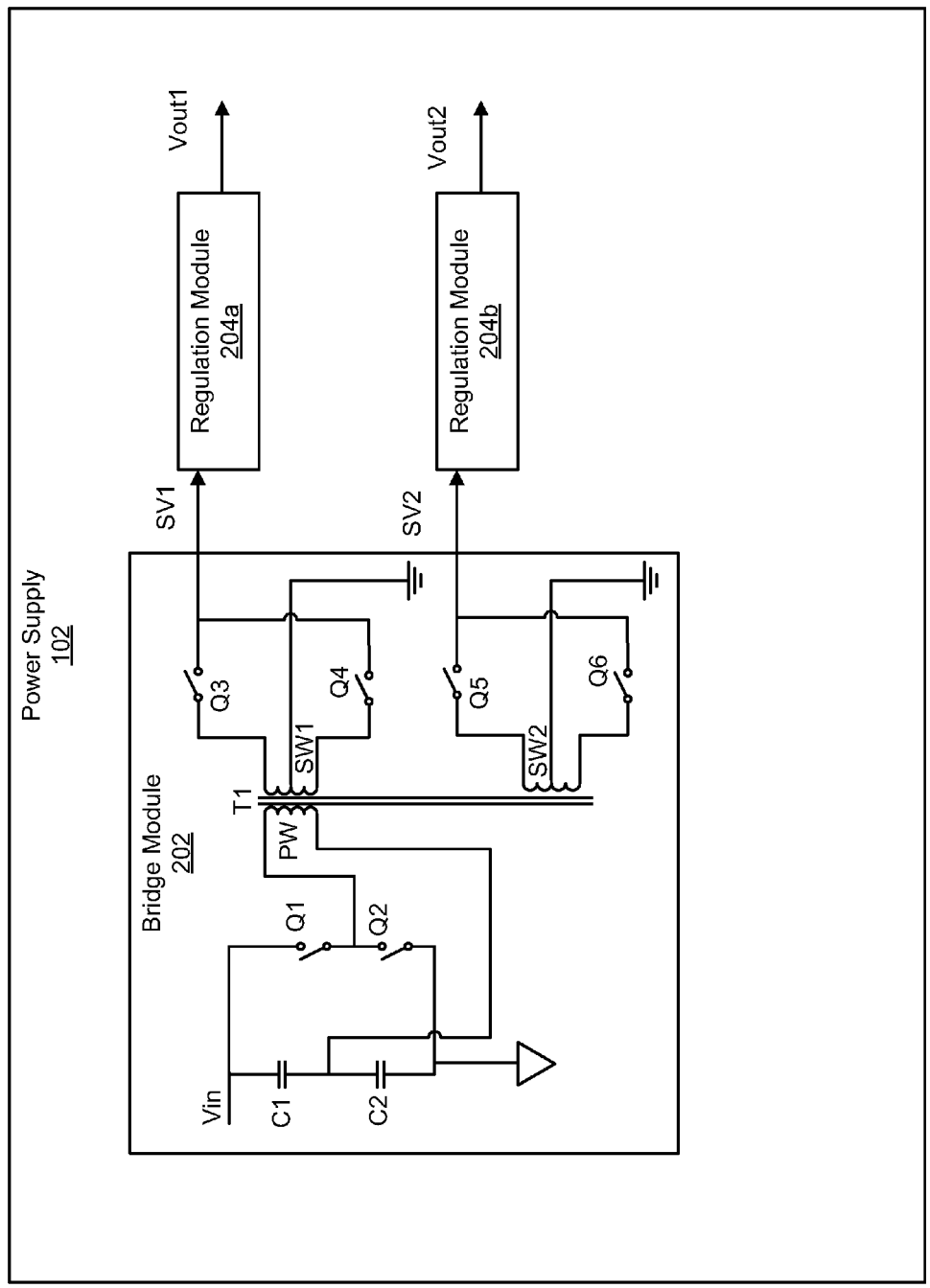
FIG. 3 is a schematic block diagram illustrating one embodiment of a power supply with one embodiment of a bridge module in accordance with the present invention.

FIG. 3 is a schematic block diagram illustrating one embodiment of a power supply 102 with one embodiment of a bridge module 202 in accordance with the present invention. As depicted, the bridge module 202 includes a half-bridge topology that includes a primary complementary pair of switches Q1, Q2, two capacitors C1, C2, a transformer T1 with a primary winding PW and two secondary windings SW1, SW2, and a secondary complementary pair of switches on the secondary side of each secondary winding SW1, SW2 of the transformer T1.

A primary voltage Vin is received as an input to the bridge module 202 and is divided across the two capacitors C1, C2. The primary complementary switches Q1, Q2 are operated to cause a current to pass through the primary winding PW of the transformer T1, thereby causing a current to pass be generated in the secondary windings SW1, SW2. The primary complementary switches Q1, Q2 are preferably operated to equally share the duty cycle. Thus, each switch Q1, Q2 is operated at about a 50% duty cycle in a zero-voltage-switching mode such that as one switch Q1 turns off, the other switch Q2 turns on and vice versa. As the switches Q1, Q2 alternate turning on and off, power is transformed to the secondary side of the transformer T1 where it is rectified by the corresponding secondary complementary switches Q3, Q4, Q5, Q6.

The duty cycle is slightly less than 50% to allow zero-voltage switching. For example, when switches Q1, Q3, and Q5 open, switches Q2, Q4, and Q6 are not immediately closed. Instead, when switch Q1 opens, parasitic inductance of the transformer T1 and parasitic capacitance of switch Q1 allows the voltage across switch Q1 to rise to equal the voltage across capacitor C1 and the transformer. This forces the voltage across switch Q2 momentarily to near zero. Switch Q2 is then allowed to close while the voltage is near zero across switch Q2, thus increasing efficiency by reducing switching losses. Switch Q1 is also switched at zero voltage when switch Q2 is opened and the parasitic capacitance of switch Q2 is allowed to charge, forcing the voltage across switch Q1 to be reduced to at or near zero.

Preferably, the secondary complementary switches Q3, Q4, Q5, Q6 are also operated in an open loop mode with each switch Q3, Q4, Q5, Q6 having about a 50% duty cycle. The secondary complementary switches Q3, Q4, Q5, Q6 are turned on and off mirroring the operation of the primary complementary switches Q1, Q2 such that substantially DC secondary voltages SV1, SV2 are generated at the output of the bridge module 202. As the primary complementary switches Q1, Q2 switch on and off the direction of the current through the primary winding PW will also change directions. Subsequently, the current in the secondary windings SW1, SW2 will also change directions each time the primary complementary switches Q1, Q2 are switched on and off. Thus, the secondary complementary pairs of switches Q3, Q4, Q5, Q6 are operated such that the secondary output voltages SV1, SV2 are rectified, thereby producing substantially constant DC voltages. The rectified secondary output voltages SV1, SV2 are then passed to the output voltage Vout1, Vout2 regulation modules 204a-b for regulation and output.

Figure 4:
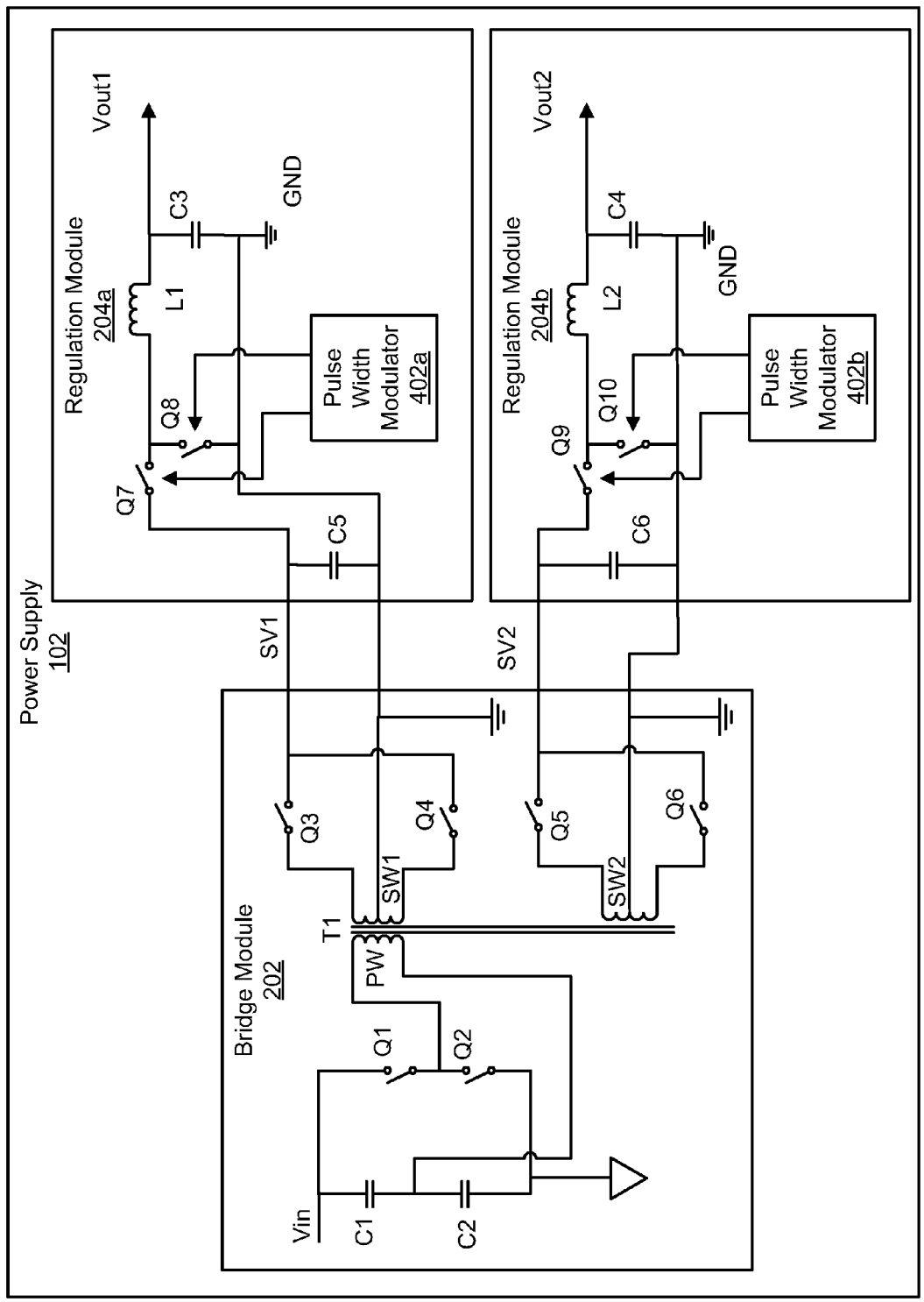
FIG. 4 is a schematic block diagram illustrating one embodiment of a power supply with detailed embodiments of a bridge module and two regulation modules in accordance with the present invention.

FIG. 4 is a schematic block diagram illustrating one embodiment of a power supply 102 with detailed embodiments of a bridge module 202 and two regulation modules 204a-b in accordance with the present invention. Preferably, one or more regulation modules 204a-b are provided for each secondary winding SW1, SW2 of the transformer T1. In the depicted embodiment, each output regulation module 204a-b includes a pair of switches Q7, Q8, Q9, Q10 and a switch controller or pulse width modulator 402a-b for controlling the switches. The pulse width modulators 402a-b may be operated to regulate the output voltages Vout1, Vout2 within desired constraints. In some embodiments, the pulse width modulators 402a-b may receive a feedback signal for more accurately and efficiently regulating the output voltages Vout1, Vout2. The regulation modules 204a-b may also include additional circuitry for filtering the regulated voltages such as inductors L1, L2 and capacitors C3, C4.

Typically, the pairs of switches Q7, Q8, Q9, Q10 are operated in a complementary fashion such that when one is on the other is off and vice versa. For example, when the first switch Q7 is on, and the second switch Q8 is off, the capacitor C3 will be charged up through the inductor L1 by the incoming secondary output voltage SV1. Then, when the first switch Q7 is off and the second switch Q8 is on, energy is supplied from the magnetic field of the inductor L1 and the electric field of the capacitor C3 to the output, until the switches are reversed again to recharge the capacitor C3. In this manner, the output voltage Vout1 is regulated to a substantially constant value.

Because the secondary output voltages SV1, SV2 are substantially DC voltages that are preferably within a predefined threshold voltage of the desired output voltages Vout1, Vout2, the output voltages Vout1, Vout2 can be regulated very efficiently by the regulation modules 204a-b. In some embodiments, the predefined threshold voltage for each regulated output voltage Vout1, Vout2 may be defined such that the output switching regulator modules 204a-b, and accordingly the power supply 102, may operate above a predefined efficiency threshold. It is contemplated that the present invention maybe utilized to achieve power supply efficiency levels greater than 90%. Further, by generating secondary output voltages SV1, SV2 that are very close in value to their corresponding output voltages Vout1, Vout2, even higher efficiency levels can be attained.

In one embodiment, a capacitor C5, C6 may be included at the input of each regulation module 204a-b in order help maintain a smoother input signal SV1, SV2 from the secondary windings SW1, SW2.

Those of skill in the art will recognize that the regulation modules 204a-b may be implemented in various topologies. In FIG. 4, the regulation modules 204a-b are depicted as "buck type" converters. However, in other embodiments the regulation modules 204a-b may be implemented as "boost type," "buck-boost type," or other topology recognized by those of skill in the art. Furthermore, variations in the components of the various topologies are also contemplated.

For example, in some embodiments, one or more of the switches Q7, Q8, Q9, Q10 may be replaced by one or more diodes. However, switches are preferred in order to improve efficiency. In accordance with the present invention, the topology is chosen such that the regulation modules 204a-b operate most efficiently when the relationship in value of the secondary output voltages SV1, SV2 and the regulated output voltages Vout1, Vout2 is within some predetermined efficiency range. In the depicted embodiment, the greatest efficiency is typically achieved when the secondary output voltages SV1, SV2 are close in value, but slightly above the regulated output voltages Vout1, Vout2. In other topologies, the secondary output voltages SV1, SV2 may be chosen differently so that regulation modules 204a-b with topologies different than a buck-derived topology may operate with a duty cycle range that is most efficient for the particular topology.

Thus, where the bridge module 202 operates in a zero-voltage-switching open loop mode to generate substantially DC secondary output voltages SV1, SV2 as inputs to the regulation modules 204a-b, and the regulation modules 204a-b are implemented for highest efficiency based on the relative values of the secondary output voltages SV1, SV2 to the regulated output voltages Vout1, Vout2, extremely high efficiencies can be achieved. High efficiency is achieved because both the bridge module 202 and the regulation modules 204 generally operate very efficiently.

Figure 5:
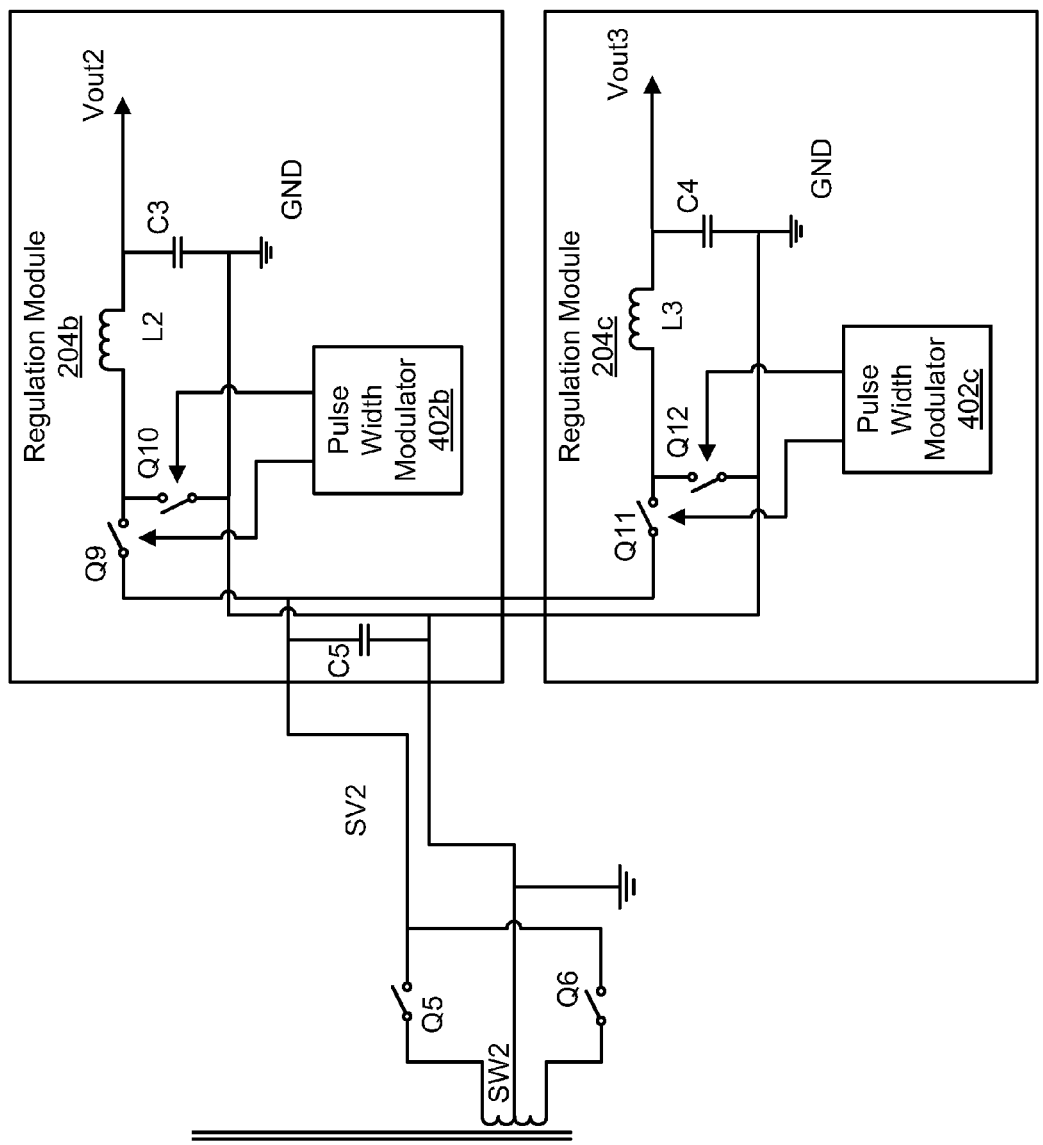
FIG. 5 is a schematic block diagram illustrating one embodiment of two regulation modules that share a single secondary winding in accordance with the present invention.

FIG. 5 is a schematic block diagram illustrating embodiments of two regulation modules 204b-c that share a single secondary winding in accordance with the present invention. As depicted, two regulation modules 204b-c derive regulated output voltages Vout2, Vout3 from a single secondary winding SW2. The regulation modules 204b-c receive the secondary output voltage SV2 as an input, and each regulation module 204b-c has its own switches Q9, Q10, Q11, Q12, pulse width modulator 402b-c, inductor L2, L3, and capacitor C3, C4 for regulating and filtering the desired output voltages Vout2, Vout3. In some embodiments, additional circuitry such as diodes may be utilized to separate the circuitry of the first regulation module 204b from the second regulation module 204c. For example, a diode might be placed at the input of each regulation module 204b-c just before first switches Q9, Q11.

As has been noted, one advantage obtained by using multiple secondary windings SW1, SW2 is that secondary output voltages SV1, SV2 can be generated that are very close to the desired regulated output voltages Vout1, Vout2, which allows for very efficient operation of the power supply 102. However, it is possible that two distinct output voltages Vout2, Vout3 may be desired that are very close to each other in value, in which case a single secondary winding SW2 may be utilized to efficiently generate both output voltages Vout2, Vout3.

For example, suppose that the system 100 requires both +5 Volt and +3.3 Volt output voltages Vout2, Vout3. Now suppose that the bridge module 202 is configured to generate a +5.2 Volt secondary output voltage SV2. This +5.2 Volt secondary output voltage SV2 may be close enough to the desired +3.3 Volt output voltage Vout3 such that both the +5 Volt and the +3.3 Volt output voltages Vout2, Vout3 may be efficiently generated from the +5.2 volt secondary output voltage SV2.

In one embodiment, a predefined threshold voltage may be defined that corresponds to a particular required efficiency threshold. For example, it might be specified that the secondary output voltage SV2 be within 2 Volts of the regulated output voltages Vout2, Vout3. In such a case, it is clear that both a +5 Volt and a +3.3 Volt output voltage Vout2, Vout3 may be generated from the single secondary output voltage SV2 of +5.2 Volts, because each is within 2 Volts of the secondary voltage SV2. Such a requirement helps to ensure that the power supply 102 is operated above a desired efficiency threshold.

Figure 6:
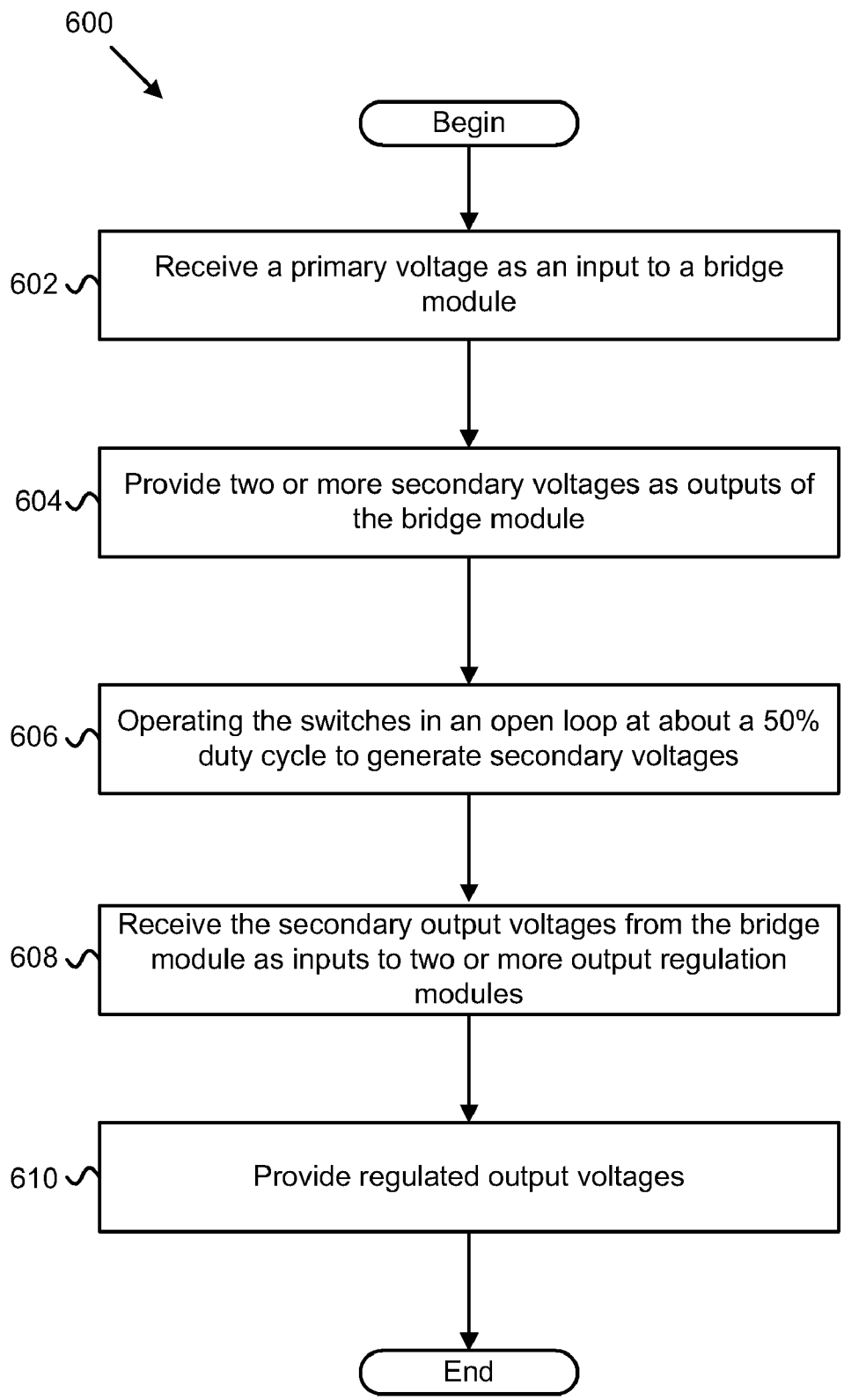
FIG. 6 is a schematic flow chart diagram illustrating one embodiment of a method for providing efficient multiple power outputs in accordance with the present invention.

FIG. 6 is a schematic flow chart diagram illustrating one embodiment of a method 600 for providing efficient multiple power outputs in accordance with the present invention. The method 600 substantially includes the embodiments and modules described above.

The method 600 begins when a bridge module 202 receives 602 a primary voltage as an input to the bridge module 202. The bridge module 202 provides 604 two more secondary voltages SV1, SV2 as outputs. The one or more secondary voltages SV1, SV2 are preferably substantially direct current voltages generated on the secondary side of one or more respective secondary windings SW1, SW2 of a transformer T1. The one or more secondary windings SW1, SW2 are coupled to a primary winding PW of the transformer T1. The bridge module 202 also includes at least one complementary pair of switches Q1, Q2 on the primary side of the transformer and a secondary complementary pair of switches Q3, Q4, Q5, Q6 on the secondary side of each secondary winding SW1, SW2 of the transformer T1. Typically, the primary complementary pair of switches is configured in a half-bridge topology. However, a full-bridge topology and push-pull converter topology are also contemplated.

The complementary switches Q3, Q4, Q5, Q6 are operated 606 in an open loop at about a 50% duty to generate the secondary voltages SV1, SV2 as outputs. The secondary output voltages SV1, SV2 are received 608 by one or more output voltage regulation modules 204a-c as inputs. Each output voltage regulation module receives 608 one of the secondary voltages SV1, SV2 from the bridge module 202 and provides 610 at least one regulated output voltage Vout1, Vout2, Vout3 as an output, and The method 600 ends. Each of the output voltage regulation modules 204a-c corresponds respectively to one of the one or more secondary windings SW1, SW2 of the transformer T1.

In one embodiment of the method 600, at least the switches of the primary complementary pair of switches Q1, Q2 on the primary side of the transformer T1 are operated in a zero-voltage-switching mode. In another embodiment, each regulated output voltage Vout1, Vout2, Vout3 may be configured to be within a predefined threshold voltage of a corresponding secondary voltage SV1, SV2 provided on the secondary side of the transformer T1. In some embodiments, each predefined threshold voltage may correspond to a predefined efficiency threshold for the regulation modules 204a-c or the power supply 102 as a whole. For example, a predefined threshold voltage may be defined to ensure that the power supply 102 operates above a 90% efficiency level.

In further embodiments, multiple regulated output voltages Vout2, Vout3 may be generated from a single secondary winding SW2 of the transformer T1. In such an embodiment, each regulated output voltage Vout2, Vout3 is within a predefined threshold voltage of a single secondary output voltage SV2 (i.e. within 3 volts).

In this manner, multiple power outputs can be very efficiently provided by utilizing multiple secondary windings SW1, SW2 of a transformer T1 to eliminate unneeded sequential stages from a power supply 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to provide efficient multiple power outputs, the apparatus comprising:
a bridge module that receives a primary voltage as an input and provides one or more secondary voltages as outputs, wherein the one or more secondary voltages are substantially direct current ("DC") voltages and wherein the one or more secondary voltages are generated on the secondary side of one or more respective secondary windings of a transformer, the one or more secondary windings coupled to a primary winding of the transformer, the bridge module comprising at least one primary complementary pair of switches on the primary winding side of the transformer and a secondary complementary pair of switches on the secondary side of each secondary winding of the transformer, the primary and secondary complementary pairs of switches operated in an open loop at about a 50% duty cycle to generate the secondary voltages; and
one or more output voltage regulation modules, wherein each output voltage regulation module receives one of the secondary voltages from the bridge module as an input and provides at least one regulated output voltage as an output, each of the one or more output voltage regulation modules corresponding respectively to one of the one or more secondary windings of the bridge module.

2. The apparatus of claim 1, wherein at least the switches of the primary complementary pair of switches on the primary winding side of the transformer are operated in a zero voltage switching mode.

3. The apparatus of claim 2, wherein the switches of the primary complementary pair of switches on the primary winding side of the transformer are configured in a half-bridge topology.

4. The apparatus of claim 1, wherein the primary complementary pair of switches is a first primary complementary pair of switches and the bridge module further comprises a second primary complementary pair of switches, the first and second pairs of primary complementary switches configured in a full-bridge topology, the first and second primary pairs of complementary switches operated in a zero voltage switching mode.

5. The apparatus of claim 1, wherein each regulated output voltage is configured to be within a predefined threshold voltage of the corresponding secondary voltage provided on the secondary side of the transformer.

6. The apparatus of claim 5, wherein each of the output regulation modules comprises an output switching regulator with at least one switch and a switch controller, the switch controller operating the at least one switch to regulate the corresponding regulated output voltage, the predefined threshold voltage for each regulated output voltage defined such that the output switching regulator operates above a predefined efficiency threshold.

7. The apparatus of claim 6, wherein the predefined efficiency corresponds to a duty cycle range of the output switching regulator wherein the output switching regulator operates near a maximum efficiency.

8. The apparatus of claim 1, wherein at least one of the output voltage regulation modules provides at least two regulated output voltages derived from a single secondary winding.

9. The apparatus of claim 8, wherein each of the at least two regulated output voltages derived from the single secondary winding are configured to be within a predetermined threshold voltage of the corresponding secondary voltage generated on the secondary side of the single secondary winding.

10. The apparatus of claim 9, wherein each of the at least two regulated output voltages derived from the single secondary winding is regulated by a distinct output switching regulator with at least one switch and a switch controller, the switch controller operating the at least one switch to regulate the corresponding regulated output voltage.

11. A system to provide efficient multiple power outputs, the system comprising:
a power supply, the power supply configured to provide power to one or more electronic devices;
a bridge module that receives a primary voltage as an input and provides one or more secondary voltages as outputs, wherein the one or more secondary voltages are substantially direct current ("DC") voltages and wherein the one or more secondary voltages are generated on the secondary side of one or more respective secondary windings of a transformer, the one or more secondary windings coupled to a primary winding of the transformer, the bridge module comprising at least one primary complementary pair of switches on the primary winding side of the transformer and a secondary complementary pair of switches on the secondary side of each secondary winding of the transformer, the primary and secondary complementary pairs of switches operated in an open loop at about a 50% duty cycle to generate the secondary voltages; and one or more output voltage regulation modules, wherein each output voltage regulation module receives one of the secondary voltages from the bridge module as an input and provides at least one regulated output voltage as an output, each of the one or more output voltage regulation modules corresponding respectively to one of the one or more secondary windings of the bridge module.

12. The system of claim 11, further comprising one or more electronic devices that receive regulated power from the power supply.

13. The system of claim 12, wherein at least one of the one or more electronic devices comprises one of a blade server, peripheral component interconnect ("PCI") card, personal computer, laptop, router, switch, personal digital assistant, appliance, and digital media player.

14. A method of providing efficient multiple power outputs, the method comprising:

receiving a primary voltage as an input to a bridge module and providing one or more secondary voltages as outputs of the bridge module, wherein the one or more secondary voltages are substantially direct current ("DC") voltages and wherein the one or more secondary voltages are generated on the secondary side of one or more respective secondary windings of a transformer, the one or more secondary windings coupled to a primary winding of the transformer, the bridge module comprising at least one primary complementary pair of switches on the primary winding side of the transformer and a secondary complementary pair of switches on the secondary side of each secondary winding of the transformer, the primary and secondary complementary pairs of switches operated in an open loop at about a 50% duty cycle to generate the secondary voltages; and receiving the secondary output voltages from the bridge module as inputs to one or more output voltage regulation modules, wherein each output voltage regulation module receives one of the secondary voltages from the bridge module as an input and provides at least one regulated output voltage as an output, each of the one or more output voltage regulation modules corresponding respectively to one of the one or more secondary windings of the bridge module.

15. The method of claim 14, further comprising operating at least the switches of the primary complementary pair of switches on the primary winding side of the transformer are operated in a zero voltage switching mode.

16. The method of claim 15, wherein the switches of the primary complementary pair of switches on the primary winding side of the transformer are configured in a half-bridge topology.

17. The method of claim 14, wherein the primary complementary pair of switches is a first primary complementary pair of switches and the bridge module further comprises a second primary complementary pair of switches, the first and second pairs of primary complementary switches configured in a full-bridge topology, the first and second pairs of primary complementary switches operated in a zero voltage switching mode.

18. The method of claim 14, wherein each regulated output voltage is configured to be within a predefined threshold voltage of a corresponding secondary voltage provided on the secondary side of the transformer.

19. The method of claim 18, wherein each of the output regulation modules comprises an output switching regulator with at least one switch and a switch controller, the switch controller operating the at least one switch to regulate the corresponding regulated output voltage, the predefined threshold voltage for each regulated output voltage defined such that the output switching regulator operates above a predefined efficiency threshold.

20. A power supply to provide efficient multiple power outputs, the power supply comprising:

a bridge module that receives a primary voltage as an input and provides one or more secondary voltages as outputs, wherein the one or more secondary voltages are substantially direct current ("DC") voltages and wherein the one or more secondary voltages are generated on the secondary side of one or more respective secondary windings of a transformer, the one or more secondary windings coupled to a primary winding of the transformer, the bridge module comprising at least one primary complementary pair of switches on the primary winding side of the transformer configured in a half-bridge topology and a secondary complementary pair of switches on the secondary side of each secondary winding of the transformer, the primary and secondary complementary pairs of switches operated in an open loop at about a 50% duty cycle and operated in a zero voltage switching mode to generate the secondary voltages; and one or more output voltage regulation modules, wherein each output voltage regulation module receives one of the secondary voltages from the bridge module as an input and provides at least one regulated output voltage as an output, each of the one or more output voltage regulation modules corresponding respectively to one of the one or more secondary windings of the bridge module, wherein each regulated output voltage is configured to be within a predefined threshold voltage of the corresponding secondary voltage provided on the secondary side of the transformer, each regulation module comprising an output switching regulator with at least one switch and a switch controller, the switch controller operating the at least one switch to regulate the corresponding regulated output voltage, the predefined threshold voltage for each regulated output voltage defined such that the output switching regulator operates above a predefined efficiency threshold.

* * * * *